(12) United States Patent
Miyamoto

(10) Patent No.: US 6,450,918 B1
(45) Date of Patent: Sep. 17, 2002

(54) SYNCHRONOUS MESHING TYPE AUTOMATIC TRANSMISSION CONTROL SYSTEM

(75) Inventor: Syoichi Miyamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/844,279

(22) Filed: Apr. 30, 2001

(30) Foreign Application Priority Data

Oct. 10, 2000 (JP) .................................. P 2000-309823

(51) Int. Cl.[7] .............................................. B60K 41/28
(52) U.S. Cl. ............................. 477/79; 477/80; 477/86
(58) Field of Search ............................. 477/77, 79, 80, 477/83, 84, 86

(56) References Cited

U.S. PATENT DOCUMENTS 5,441,462 A * 8/1995 Chan .......................... 477/86
5,842,376 A * 12/1998 Dresden, III et al. ........ 477/86
6,035,734 A * 3/2000 Le Van ........................ 477/86
6,102,829 A * 8/2000 Muddell et al. .............. 477/77

FOREIGN PATENT DOCUMENTS

JP 63-270252 11/1988 ........... B60K/41/02

* cited by examiner

Primary Examiner—Sherry Estremsky
(74) Attorney, Agent, or Firm—Sughrue Mion, PLLC

(57) ABSTRACT

A synchronous meshing type automatic transmission control system is provided to be capable of shortening a time for gear change without generation of noises from gears and degradation of a synchronizing mechanism in durability, and comprises an internal combustion engine mounted on a vehicle, a speed change mechanism coupled to the internal combustion engine through a clutch, a shift-select actuator for selectively coupling one set of a plurality of sets of speed change gears having different gear ratios and intervening between an input shaft coupled to the clutch of the speed change mechanism and an output shaft for driving the vehicle, and a control device for inputting thereinto an output signal of a shift-select position sensor, which detects a selected position of the shift-select actuator, to operate a position of the shift-select actuator for gear change and for putting the clutch in weak coupling in a state, in which no gear is coupled between the input shaft and the output shaft in the course of gear change.

2 Claims, 4 Drawing Sheets

SYNCHRONOUS MESHING TYPE AUTOMATIC TRANSMISSION CONTROL SYSTEM

BACKGROUND OF THE INVENTION

The invention relates to control of a synchronous meshing type automatic transmission control system coupled to a crankshaft of an internal combustion engine via a clutch, and more particularly, to control for shortening a gear change time.

A method of controlling a synchronous meshing type automatic transmission control system used in a vehicle is disclosed in, for example, Japanese Patent Laid-Open No. 270252/1988. A technique disclosed in this document comprises, in an arrangement, in which a synchronous meshing type automatic transmission control system is coupled to an internal combustion engine via an electromagnetic clutch, controlling a throttle opening so that an amplitude of change between the rotational speed of the internal combustion engine at the time of release of the electromagnetic clutch and the rotational speed of the internal combustion engine at the time of coupling of the electromagnetic clutch when speed change gears are to be switched is maintained within a predetermined range, and correcting a relationship between the rotational speed of the internal combustion engine and the throttle opening with the use of a learning routine every speed change operation so that such control can correspond to respective conditions and dispersion in internal combustion engines, thereby mitigating a speed change shock.

A shift device disclosed in the prior art for performing gear change of a synchronous meshing type automatic transmission control system employs a pair of three-position hydraulic cylinders for actuating a shift-select lever in an axial direction and in a direction of rotation, and is designed to drive a three-position hydraulic cylinder for selection to select a shift rod and to drive a three-position hydraulic cylinder for shift to move the selected shift rod, thus performing speed change stages. Also, in addition to such hydraulic type shift device, there is generally used an electrically driven, synchronous meshing type automatic transmission control system which uses two motors to perform shift driving and select driving.

The switching action of gear stages in an electrically driven, synchronous meshing type automatic transmission control system comprises using a select actuator to select a coupling means being operated while controlling a select position by means of a positional signal of a select position sensor, and moving the coupling means by means of a shift actuator to perform coupling of a target gear while controlling a shift position by means of a positional signal of a shift position sensor, controlling an amount of driving of a shift-select actuator with a parameter being a deviation amount between an actual shift-select position detected by a shift-select position sensor and a target shift-select position to conform the shift-select position to the target position, and using an electromagnetic clutch to make transmission of power between an internal combustion engine and the synchronous meshing type automatic speed change mechanism ON/OFF in speed change operation.

In a vehicle using such synchronous meshing type automatic speed change mechanism and a clutch in transmission and shut-off of power between a crankshaft of an internal combustion engine and an input shaft of the synchronous meshing type automatic speed change mechanism, moment of inertia becomes great since gears and a driven member of the clutch are mounted on the input shaft of the synchronous meshing type automatic speed change mechanism, whereby it takes time in achieving rotational synchronization of the input shaft of the synchronous meshing type automatic speed change mechanism and an output shaft at the time of gear change, so that there is caused a problem that such time for gear change gives a driver an uncomfortable feeling to worsen a driving feeling. Also, when an action of rotational synchronization is suddenly performed in order to shorten a time of speed change for coping with such problem, there is caused a problem that noises generate from gears and a synchronizing mechanism for achieving rotational synchronization is degraded in durability.

SUMMARY OF THE INVENTION

The invention has been contemplated to solve such problems, and has its object to provide a synchronous meshing type automatic transmission control system capable of shortening a time for gear change without generation of noises from gears and degradation of a synchronizing mechanism in durability.

A synchronous meshing type automatic transmission control system according to the invention comprises a speed change mechanism coupled to an internal combustion engine on a vehicle through a clutch, a shift-select actuator for selectively coupling one set of a plurality of sets of speed change gears having different gear ratios and intervening between an input shaft of the speed change mechanism coupled to the clutch and an output shaft of the speed change mechanism for driving the vehicle, a shift-select position sensor for detecting a selected position of the shift-select actuator, and a control means for inputting thereinto an output signal of the shift-select position sensor to operate a position of the shift-select actuator for gear change and for putting the clutch in weak coupling in the case where the internal combustion engine is smaller in rotational speed than the input shaft of the speed change mechanism in a state, in which no gear is coupled between the input shaft and the output shaft in the course of gear change.

Also, according to the invention the coupling strength of the clutch put in weak coupling is set on the basis of rotational speed of the internal combustion engine, whereby it is possible to stably shorten a time for gear change irrespective of rotational speeds of the internal combustion engine and of the input shaft in the initial stage of speed change action.

DESCRIPTION OF PREFERRED EMBODIMENTS

First Embodiment

Figure 1:
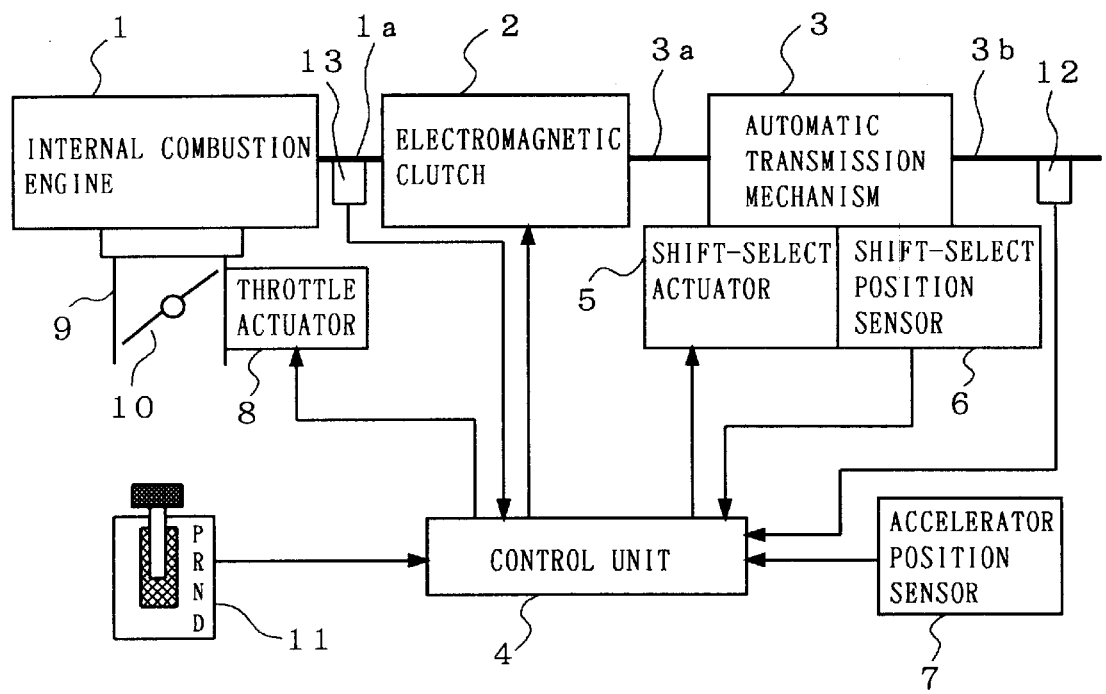
FIG. 1 is a block diagram showing a constitution of a synchronous meshing type automatic transmission control system according to a first embodiment of the invention.
Figure 2:
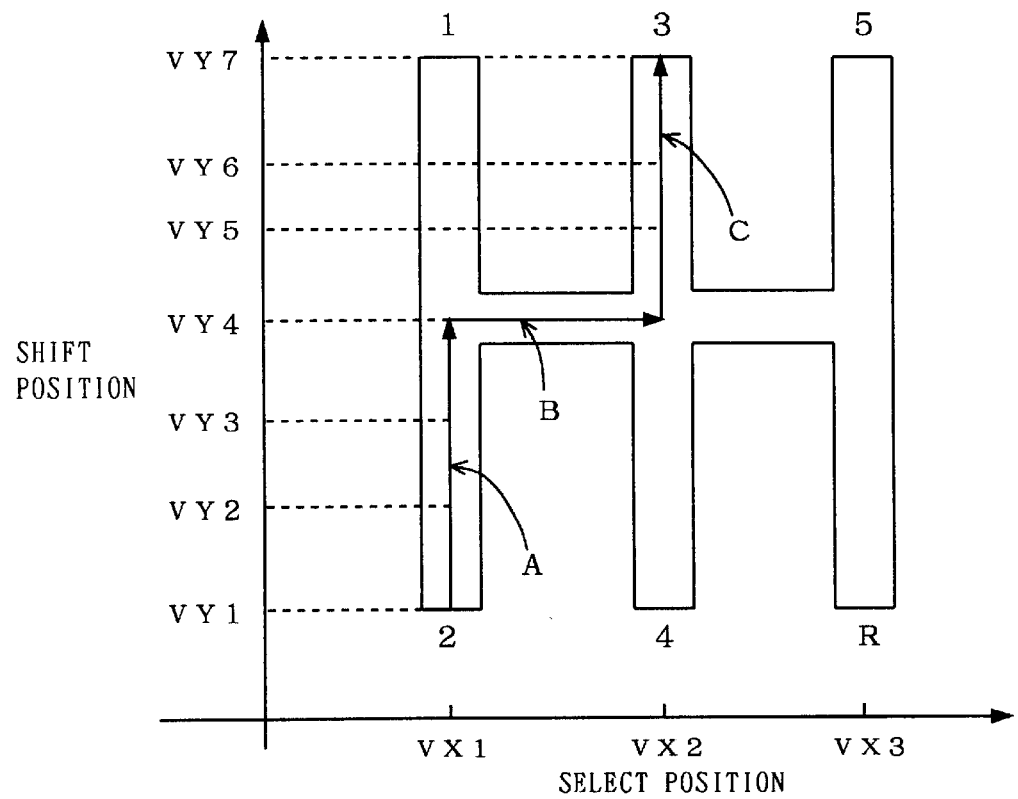
FIG. 2 is a view illustrating an operation of the synchronous meshing type automatic transmission control system according to the first embodiment of the invention.
Figure 3:
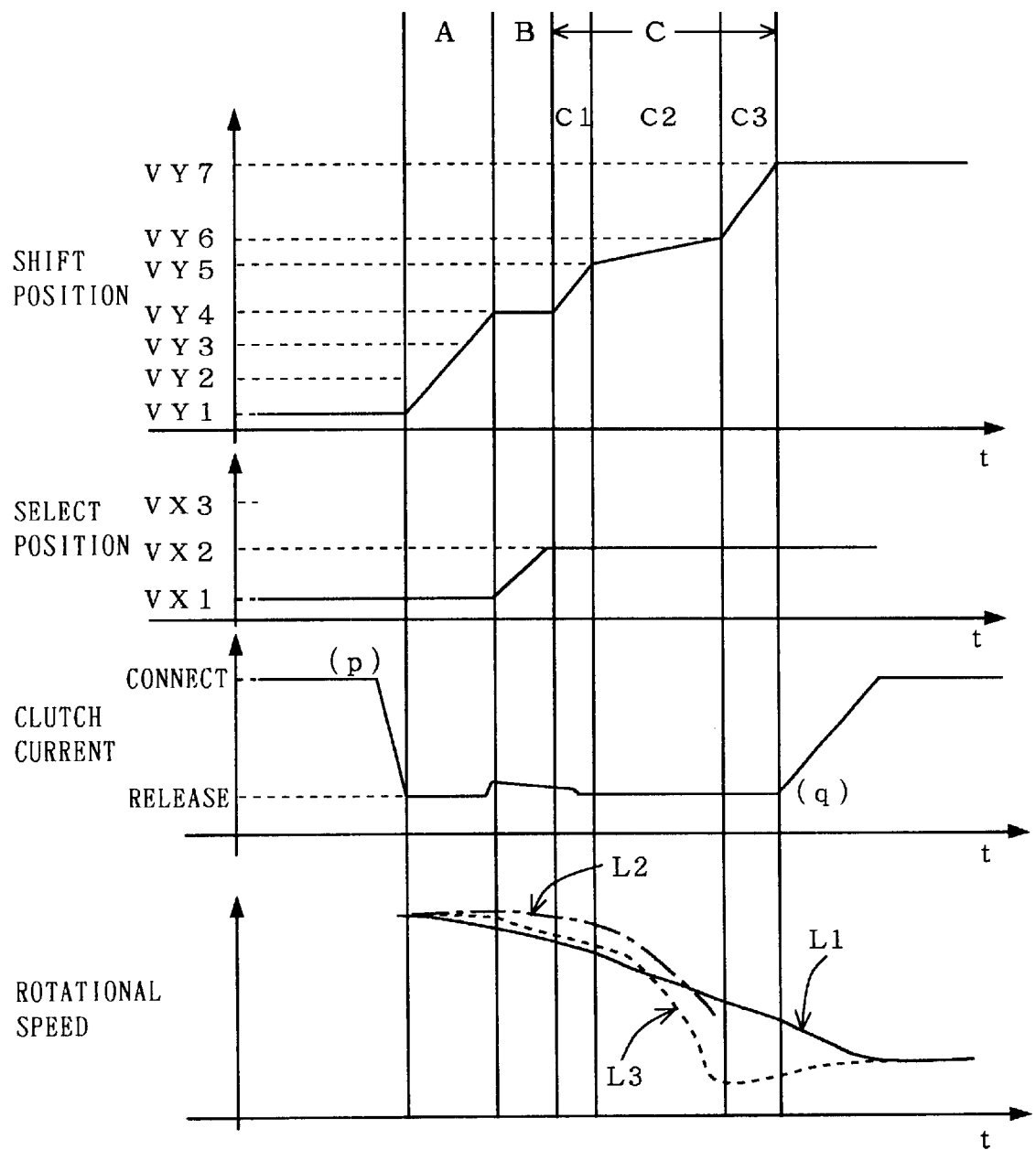
FIG. 3 is a view illustrating an operation of the synchronous meshing type automatic transmission control system according to the first embodiment of the invention.
Figure 4:
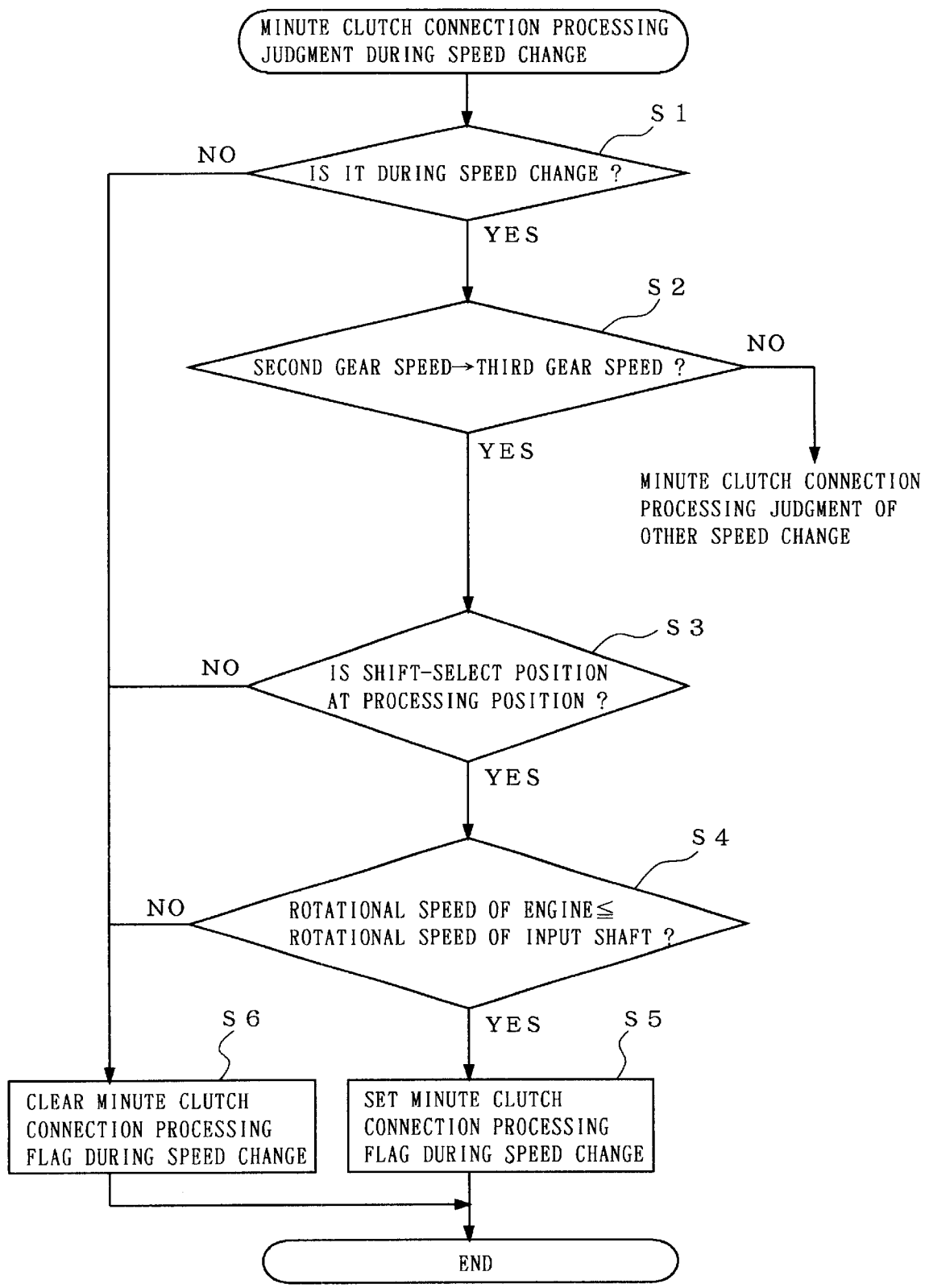
FIG. 4 is a flowchart illustrating an operation of the synchronous meshing type automatic transmission control system according to the first embodiment of the invention.
Figure 5:
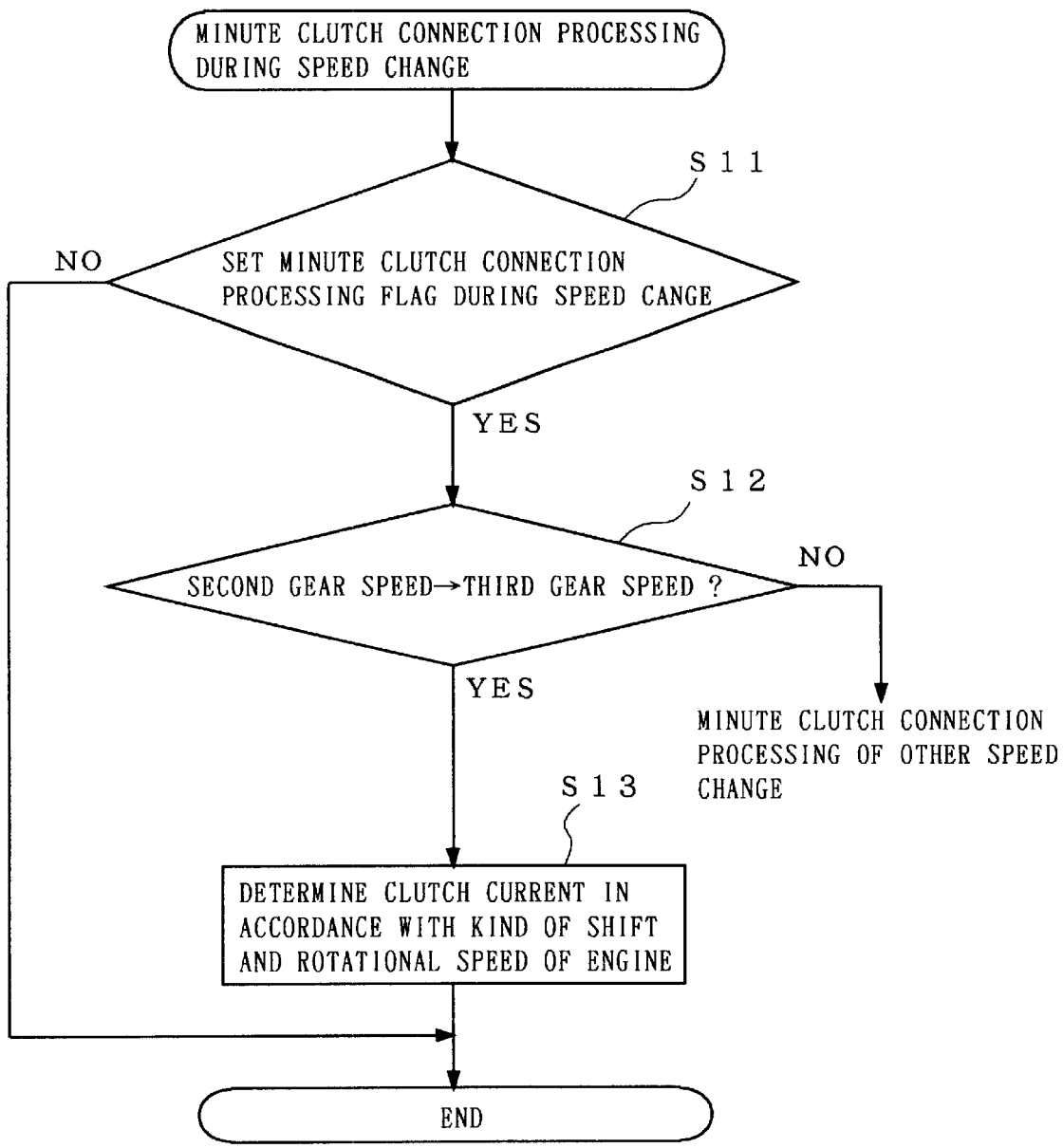
FIG. 5 is a flowchart illustrating an operation of the synchronous meshing type automatic transmission control system according to the first embodiment of the invention.

FIGS. 1 to 5 illustrate a constitution and an operation of a synchronous meshing type automatic transmission control system according to a first embodiment of the invention, FIG. 1 being a block diagram showing the constitution of the synchronous meshing type automatic transmission control system, FIGS. 2 and 3 being views illustrating the operation, and FIGS. 4 and 5 being flowcharts illustrating the operation. In FIG. 1, the reference numeral 1 designates an internal combustion engine, 2 an electromagnetic clutch provided on a crankshaft 1a to couple the internal combustion engine 1 to a synchronous meshing type automatic speed change mechanism 3, 4 a control unit serving as a control means for controlling the synchronous meshing type automatic speed change mechanism 3, 5 a shift-select actuator controlled by the control unit 4 to operate gear coupling of the synchronous meshing type automatic speed change mechanism 3 in a manner described later, and 6 a shift-select position sensor for detecting an operated position of the shift-select actuator 5.

The synchronous meshing type automatic speed change mechanism 3 has an input shaft 3a and an output shaft 3b, the input shaft 3a being coupled to a driven member (not shown) of the electromagnetic clutch 2 and designed to be coupled to and separated from a crankshaft 1a of the internal combustion engine 1 upon ON/OFF of the electromagnetic clutch 2, and the output shaft 3b being designed to drive a vehicle. A plurality of sets of speed change gears (not shown) having different gear ratios are provided between the input shaft 3a and the output shaft 3b, and a shift-select actuator 5 operates a coupling mechanism (not shown) to select and couple one set among the plurality of sets of speed change gears to thereby couple the input shaft 3a and the output shaft 3b with each other, and changes selection of speed change gears to thereby effect a speed change operation.

The reference numeral 7 designates an accelerator position sensor for outputting a signal conformed to an amount of stepping of an accelerator pedal (not shown), and 8 a throttle actuator for operating an opened degree of a throttle valve 10 provided in an intake passage 9 of the internal combustion engine 1. A signal of the accelerator position sensor 7 is processed in the control unit 4 to be delivered to the throttle actuator 8 to actuate the throttle valve 10 to a target throttle opening conformed to an amount of stepping of an accelerator pedal (not shown), and is feed-back controlled by a throttle opening sensor (not shown). Also, the throttle actuator 8 is also operated by a predetermined program stored in the control unit 4 at the time of speed change action. In addition, the reference numeral 11 designates a shift lever for delivering a command of a driver's shift operation position to the control unit 4, 12 an output shaft rotational speed sensor for measuring the rotational speed of the output shaft 3b of the synchronous meshing type automatic speed change mechanism 3, and 13 an internal combustion engine rotational speed sensor for measuring the rotational speed of the internal combustion engine 1.

The electromagnetic clutch 2 is controlled by the control unit 4 to ON/OFF control coupling between the crankshaft 1a of the internal combustion engine 1 and the input shaft 3a of the synchronous meshing type automatic speed change mechanism 3, and is given an exciting current in proportion to a transfer torque. Also, the synchronous meshing type automatic speed change mechanism 3 comprises five sets of forward travel gears including, for example, first to fifth gear speed gears of different gear ratios, and a set of reverse travel gears, and while the shift-select position sensor 6 is detecting a shift position and a select position, the shift-select actuator 5 operates a position of a coupling mechanism (not shown) on the basis of a select target position and a shift target position output from the control unit 4 to perform feed-back control, thereby effecting a speed change operation.

The control unit 4 inputs thereinto a position signal from the shift lever position 11 operated by a driver, an accelerator pedal operating amount signal from the accelerator position sensor 7, a rotational speed signal from the output shaft rotational speed sensor 12, a rotational speed signal from the internal combustion engine rotational speed sensor 13 and so on to determine a number of speed suited to a running state on the basis of a shift pattern stored in the control unit 4 and to control the speed change operation by operating the shift-select actuator 5 while detecting a shift-select position by means of the shift-select position sensor 6 as well as to control the electromagnetic clutch 2 at the time of such speed change operation in a manner described later.

Contents of control at the time of such speed change operation with the control unit 4 are illustrated in FIGS. 2 and 3, and an explanation will be exemplarily given to the case where the speed change position of the synchronous meshing type automatic speed change mechanism 3 shifts from the second gear speed position to the third gear speed position. FIG. 2 shows a relationship between a shift-select position and an output voltage of the shift-select position sensor 6, and a value of the output voltage of the shift-select position sensor 6 serves as a target position of the shift-select actuator 5 operated by the control unit 4. An axis of abscissa indicates a select position, and when gears for the first gear speed and the second gear speed are selected, a target voltage (target position) is VX1, when gears for the third gear speed and the fourth gear speed are selected, a target voltage (target position) is VX2, and when gears for the fifth gear speed and the reverse travel are selected, a target voltage (target position) is VX3.

Also, an axis of ordinate indicates a shift position, and when gears for the second gear speed, the fourth gear speed and the reverse travel are selected, a target voltage (target position) is VY1, and when gears for the first gear speed, the third gear speed and the fifth gear speed are selected, a target voltage (target position) is VY7. Accordingly, when VX1 is selected for the select position and VY1 is selected for the shift position, selection of a gear for the second gear speed results. VY4 on the axis of ordinate corresponds to a neutral position, and zones between VY2 and VY3 and between VY5 and VY6 indicate a position where a synchronizing mechanism for synchronous rotation of the input shaft 3a and the output shaft 3b in accordance with a gear ratio of a coupling target gear acts while the coupling mechanism is moving in order to couple with the respective gears. Accordingly, an actual neutral zone where any one of the plurality of sets of speed change gears between the input shaft 3a and the output shaft 3b is between VY3 and VY5.

In the case where the synchronous meshing type automatic speed change mechanism 3 shifts the second gear speed to the third gear speed, it is possible to divide control among three zones. First, these include a A zone where the shift actuator changes a shift position from the second gear speed position VY1 to the neutral position VY4, a B zone where the select actuator changes a select position from the first gear speed and second gear speed position VX1 to the third gear speed and fourth gear speed position VX2, and a C zone where the shift actuator changes a shift position from the neutral position VY4 to the third gear speed VY7. In the case where shift is effected from the second gear speed position to the third gear speed position, it follows that the synchronizing mechanism operates in the zone between VY5 and VY6. A state of such shift change is shown in FIG. 3, in which time is represented on an axis of abscissa.

In FIG. 3, when the control unit 4 begins a shift operation, clutch current is made OFF at a time (p) before the beginning of shift to release coupling of the crankshaft 1a and the input shaft 3a, so that a shift position moves from the VY1 position to the VY4 position in the A zone and subsequently a select position moves from the VX1 position to the VX2 position in the B zone. Further, a shift position moves from the VY4 position to the VY5 position in a C1 zone of the C zone, and moves from the VY5 position to the VY6 position in a C2 zone. Further, a shift position moves from the VY6 position to the VY7 position in a C3 zone to complete a shift operation, and the electromagnetic clutch 2 is excited at (q) point to again couple the crankshaft 1a with the input shaft 3a. The moving speed of a shift operation is set large in the A zone and in the C1 zone, set small in the C2 zone so as to perform smooth synchronization of the input shaft 3a and the output shaft 3b in rotation since the synchronizing mechanism acts in the C2 zone and set large again in the C3 zone after synchronization in rotation is achieved.

While an exciting current is made OFF at a point of time (p) before the beginning of shift in a manner described above, the current-carrying operation of the electromagnetic clutch 2 is such that while a shift position moves to VY5 past VY3, that is, in an actual neutral zone where no one of the speed change gears effects coupling, a minute current is passed to put the clutch in a weak coupling state as shown in the drawings. While a current-carrying point of time and a current-carrying duration for the weak coupling can be optionally selected so long as the position from VY3 to VY5, it is effective to set a current-carrying value depending upon the rotational speed condition of the internal combustion engine 1.

FIG. 3 shows in its lowermost stage changes in rotational speed of the internal combustion engine 1 and the input shaft 3a until the electromagnetic clutch 2 couples again after it is shut off. More specifically, when the electromagnetic clutch 2 is made OFF at the point (p), the throttle valve 10 is closed and the rotational speed of the internal combustion engine 1 decreases with time as shown by a solid line L1 in the figure, but the input shaft 3a of the synchronous meshing type automatic speed change mechanism 3 is considerably small in rate of reduction in rotational speed as shown by a chain line L2 in the figure because of its large moment of inertia. However, a minute current is passed through the electromagnetic clutch 2 to put the same in a weak coupling state whereby the input shaft decreases in rotational speed together with the internal combustion engine 1 as shown by the chain line L3 in the figure and the synchronizing mechanism is actuated with release of the weak coupling state of the electromagnetic clutch 2, so that the input shaft 3a comes into synchronous rotation with the output shaft 3b. Hereupon, a difference in rotational speed between the input shaft 3a and the output shaft 3b decreases by an amount, by which the input shaft 3a decreases in rotational speed due to the weak coupling state of the electromagnetic clutch 2, so that it is possible to shorten a time for synchronous rotation by the synchronizing mechanism, that is, a time, during which the speed change action is performed.

FIG. 4 is a flowchart illustrating an operating state of control, in which a minute current is passed through the electromagnetic clutch 2 to put the same in the weak coupling state. Such operation comprises first judging in STEP 1 whether an action of speed change is performed, and if such action is performed, proceeding to STEP 2 to judge whether the action of speed change is from the second gear speed to the third gear speed. The reason why the action of speed change is limited to one from the second gear speed to the third gear speed is that in the case of other speed change, a shift-select position is different in value of judgment and a similar routine is set every speed change. Accordingly, when NO is judged in STEP 2, the processing will transfer to other routine, which is different in only a value of positional judgment set in another way.

When speed change is judged in STEP 2 to be from the second gear speed to the third gear speed, the processing proceeds to STEP 3 to read a shift-select position to judge whether the position permits a weak coupling state of the electromagnetic clutch 2. When the position is judged to afford weak coupling of the electromagnetic clutch 2, the processing proceeds to STEP 4 to judge whether the internal combustion engine 1 is smaller in rotational speed than the input shaft 3a of the synchronous meshing type automatic speed change mechanism 3. When the input shaft 3a is judged to be smaller in rotational speed than the internal combustion engine, the processing proceeds to STEP 5 to set a processing flag for weak coupling of the electromagnetic clutch 2. In any of the cases where NO is judged in STEP 1, STEP 3 and STEP 5, the processing proceeds to STEP 6 to clear the processing flag for weak coupling of the electromagnetic clutch 2.

Also, with a control routine shown in FIG. 5, it is judged in STEP 11 whether a processing flag, shown in FIG. 4, for weak coupling of the electromagnetic clutch 2 is in a set condition or in a cleared condition. In the case of the cleared condition, the processing is terminated, and in the set condition, the processing proceeds to STEP 12 to judge whether speed change is in the course of from the second gear speed to the third gear speed. When speed change is in the course of from the second gear speed to the third gear speed, the processing proceeds to STEP 13 to determine a value of exciting current or the like depending upon kind of shift and rotational speed of the internal combustion engine 1. When speed change is judged in STEP 12 to be in other speed change stage rather than in the course of from the second gear speed to the third gear speed, a determined value such as the value of exciting current is different, and so the processing proceeds to other routine, which is different only in a set value set in another way.

Such control routine is repeated every predetermined time to read a target speed change stage and the rotational speed of the internal combustion engine 1 upon judgment of being in the course of speed change to put the electromagnetic clutch 2 in weak coupling with a current of a condition meeting value in the case where the input shaft 3a of the synchronous meshing type automatic speed change mechanism 3 is larger in rotational speed than the internal combustion engine 1, thus making the input shaft 3a of the synchronous meshing type automatic speed change mechanism 3 consistent in rotational speed with the internal combustion engine 1. Accordingly, the input shaft 3a can be rapidly decreased in rotational speed, and for this purpose is effective to set an exciting current of the electromagnetic clutch 2 conformed to rotational speed of the internal combustion gine 1. In addition, while the above-mentioned explanation has been given to the case where the electromagnetic clutch is used for coupling of the internal combustion engine 1 and the synchronous meshing type automatic speed change mechanism such clutch is not limited to an electromagnetic one since clutches, such as hydraulic control clutch or the like, having the function capable of controlling the strength at the time of coupling can perform control in a similar manner.

What is claimed is:

1. A synchronous meshing type automatic transmission control system comprising, a speed change mechanism coupled to an internal combustion engine on a vehicle through a clutch, a shift-select actuator for selectively coupling one set of a plurality of sets of speed change gears having different gear ratios and intervening between an input shaft of the speed change mechanism coupled to the clutch and an output shaft of the speed change mechanism for driving the vehicle, a shift-select position sensor for detecting a selected position of the shift-select actuator, and a control means for inputting thereinto an output signal of the shift-select position sensor to operate a position of the shift-select actuator for gear change and for putting the clutch in weak coupling in the case where the internal combustion engine is smaller in rotational speed than the input shaft of the speed change mechanism in a state, in which no gear is coupled between the input shaft and the output shaft in the course of gear change.

2. The synchronous meshing type automatic transmission control system according to claim 1, wherein the coupling strength of the clutch put in weak coupling is set in accordance with a kind of shift in the speed change mechanism and the rotational speed of the internal combustion engine.

* * * * *